Oct. 24, 1967   V. C. KRETZ   3,348,715

VEHICLE WITH BUCKET

Filed March 28, 1966

Vincent C. Kretz
INVENTOR

BY Kolisch & Hartwell
Attys.

United States Patent Office 3,348,715
Patented Oct. 24, 1967

3,348,715
VEHICLE WITH BUCKET
Vincent C. Kretz, Seattle, Wash., assignor to Nelson Equipment Company, Portland, Oreg., a corporation of Oregon
Filed Mar. 28, 1966, Ser. No. 537,990
8 Claims. (Cl. 214—767)

ABSTRACT OF THE DISCLOSURE

A scoop bucket assembly mounted on the lifting forks of a vehicle through transversely aligned pivoted stirrups on the underside of a floor plate in the bucket assembly, the bucket assembly including a bucket pivotable to an upright position for dumping purposes by actuating operating rods journaled on the sides of the bucket at points laterally offset from the pivot axis for the stirrups.

---

This invention relates to vehicles and more particularly to a vehicle with load-lifting forks at one end thereof supporting a bucket whereby the vehicle operates as a front end bucket loader.

Vehicles with load-lifting forks are widely used in material-handling operations, as they constitute a convenient means for transporting loads from one location to another. In certain operations, the movement of loads in a given area is accompanied with the requirement that such area periodically be subjected to clean up. For example, in the lumber industry, and when handling logs in a yard, bark and other material falling from the logs tends to accumulate in the yard over a given period of time. The debris may be collected and disposed of using manual labor, but this is expensive. Alternately, mechanical equipment may be employed, but oftentimes such is needed so infrequently that the cost of acquiring a separate clean-up vehicle is unjustified from an economic standpoint. A specific embodiment of this invention comprises a detachable bucket which is readily mounted on the load-lifting forks of a vehicle, with the bucket when mounted being positionable in horizontal and upright positions for the purpose of scooping up and dumping a load, respectively.

Generally, an object of this invention is to provide a multiple-purpose material-handling vehicle having lifting forks useable in lifting and transporting articles and a bucket supported on and detachably connected to the lifting forks shiftable to various positions on the forks and employable for scooping up and carrying loose material.

A more specific object of this invention is to provide novel means including a detachable bucket for converting a vehicle with lifting forks into a front end bucket loader.

Still another object is to provide, in a vehicle with material-handling mechanism mounted on one end including lifting forks and kicker arms useable to shift a load off of the forks, novel means converting the vehicle into a bucket loader comprising a bucket with means for pivotally connecting it to the lifting forks and means also for connecting it to the kicker arms with the kicker arms operable to produce adjustments in the bucket.

A specific object is to provide a scoop bucket adaptable for mounting on the forks of a vehicle, with novel means facilitating the attachment and removal of the bucket from the forks of the vehicle, whereby maximum flexibility results in the uses to which the vehicle may be put. A related object is the provision in a bucket of novel stirrups pivotally mounted on the base thereof, useable to mount the bucket on the forks of a vehicle, with the pivot connections of the stirrups providing a pivot axis for the bucket about which it may be shifted to place it in horizontal or upright positions.

These and other objects and advantages are attained by the invention, and reference is made to the accompanying drawings which illustrate an embodiment of the invention, wherein.

Figure 1:
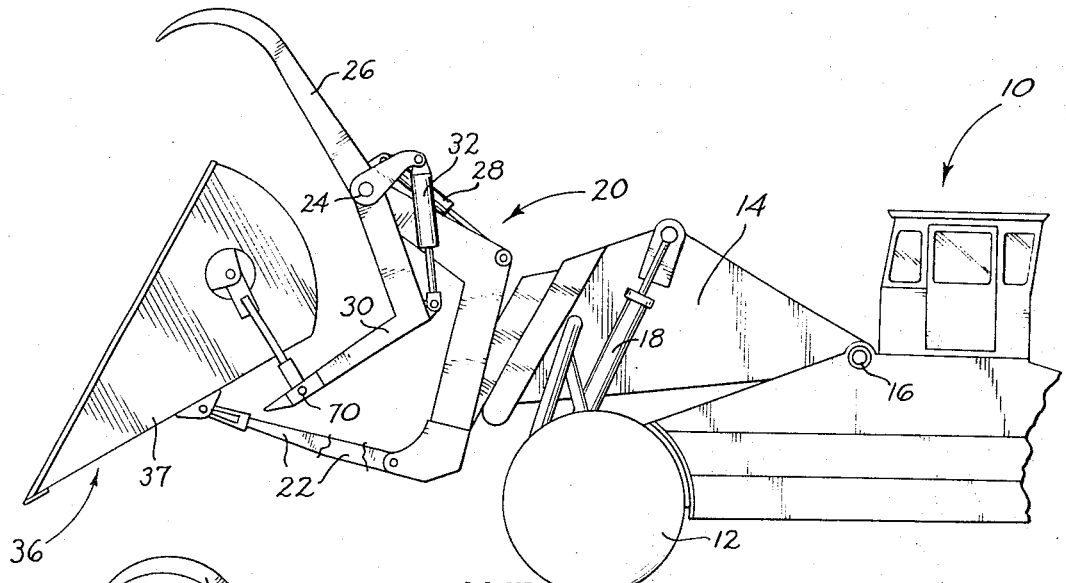
FIG. 1 is a side elevation of portions of a vehicle having lifting forks carried at one end thereof, said forks mounting a bucket shown in a partially raised and tilted position.
Figure 2:
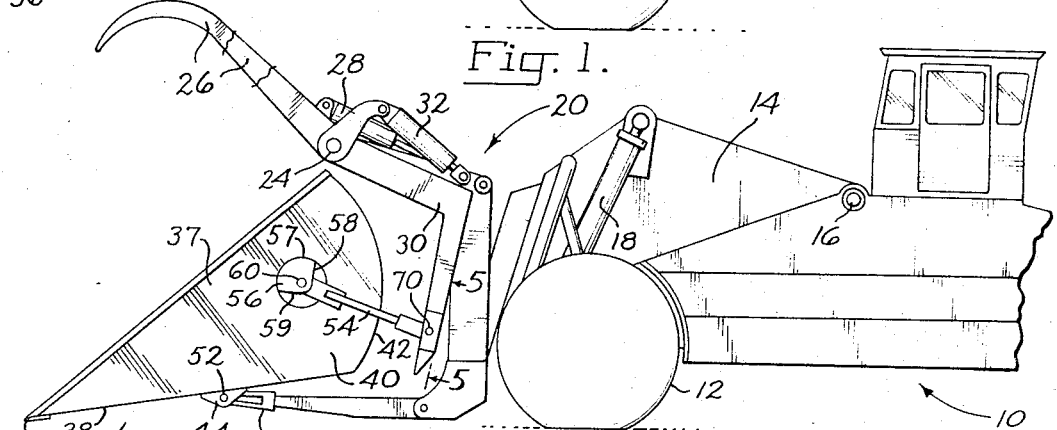
FIG. 2 is a view similar to FIG. 1, but showing the bucket in a fully lowered and approximately horizontal position.

Referring now to the drawings, and more particularly to FIGS. 1 and 2, 10 indicates generally a vehicle supported above and propelled over the ground by wheels such as wheel 12 (only one of these being visible in the side elevations shown). Mounted forwardly on vehicle 10 is a raisable boom 14. The boom is mounted at 16 for pivotal movement about a horizontal axis extending transversely of the vehicle. Hydraulic rams such as the ones shown at 18 interposed between the boom and the forward end of the frame of the vehicle are extensible to raise the forward end of the boom.

Mounted on the vehicle, more particularly on boom 14, and carried beyond the forward end thereof, is material-handling mechanism generally indicated at 20. The mechanism illustrated may be used in the picking up and carrying of logs, and thus the vehicle is referred to herein as a log stacker. The log stacker illustrated is typical of one which includes lifting forks for carrying a load and which is desirably converted into a front end bucket loader periodically, for purposes of cleaning up the yard where logs are handled.

Mechanism 20 includes a pair of laterally spaced substantially parallel lifting forks 22 which are insertable under a load. Journaled at 24 above the lifting forks are a pair of laterally spaced hold-down forks 26. With a bundle of logs resting on the lifting forks and extending transversely thereof, the hold-down forks may be lowered through extension of rams, such as ram 28, to hold the logs from rolling off the forward tips of the forks. Also journaled at 24 are a pair of laterally spaced, power-operated kicker arms, such as arm 30, actuated by rams such as ram 32, for movement between the relative positions shown in FIGS. 1 and 2. With the hold-down forks raised, the kicker arms are useable to eject a load from the lifting forks. The entire mechanism is raised and lowered through raising and lowering of boom 14 as earlier described.

A scoop-type bucket assembly is shown generally at 36. In FIGS. 1 and 2 the bucket is shown mounted on material-handling mechanism 20 by means to be specifically described, whereby the vehicle is converted from a log stacker to a front end bucket loader.

The bucket assembly comprises a bucket 37 having a floor plate 38 forming the bottom of the bucket, opposed side plates such as plate 40 forming the sides of the bucket, and a curved back plate 42 forming the rear of the bucket. The bucket is open along the front and top which enables the bucket to be moved under loose debris to collect the same, with the bucket in the substantially horizontal position shown in FIG. 2. The contents of the bucket is dumped therefrom by tilting it to a more upright position.

Attached to the underside of floor plate 38 and projecting downwardly therefrom are two sets of paired ears designated at 44 and 46. The ears are substantially aligned in a direction extending between the sides of the bucket, and are approximately midway between leading edge 48 of the bucket and back plate 42. Each set of paired ears mounts a stirrup 50 which is journaled between the ears by a pivot means 52. The mounting permits the pair of stirrups to pivot about a common axis which also extends between the side plates of the bucket.

The stirrups are hollow and are open at ends 50a. The hollow interior of each stirrup has an essentially rectangular cross section, and the height of the hollow interior of a stirrup diminishes progressing from end 50a inwardly to end 50b of the stirrup. The construction described enables the stirrups to be fitted over the tips of forks 22 in material-handling mechanism 20, whereby the bucket assembly may be mounted on the forks. If desired, screws 52 may be included which are screwed into threaded bores provided in the stirrups, which have ends that bear down on the forks when the screws are suitably tightened. With the two stirrups provided fitted over the ends of the forks, as shown in FIGS. 1 and 2, pivot means 52 for the stirrups permit the bucket to swing about an axis extending transversely of the vehicle, between substantially horizontal and upright positions.

Bucket assembly 36 further comprises a pair of operating rods 54, with one provided on each side of the bucket. Each operating rod has an end 54a fitted between a side plate 40 and a shroud plate 56. The shroud plate is joined to the side plate along edge 57, but is unjoined and spaced laterally outwardly somewhat from the side plate along edges 58, 59. A journal pin 60 pivotally mounts end 54a of the rod where the same is fitted between the shroud plate and side plate. With the bucket upright and against a wall as shown in FIG. 3, a position preferred for storing the bucket, each operating rod assumes the position shown in FIG. 3, with the rod engaging shoulder 62 formed where the shroud plate joins the side plate.

End 54b of each operating rod is provided with a bore 64. With the bucket assembly mounted on the lifting forks, each operating rod is positioned laterally outwardly slightly of a kicker arm behind the rod. Each kicker arm, as can be seen in FIG. 5, has a bracket 66 secured thereto, and in connecting a kicker arm to the operating rod, end 54b is inserted within space 68 bounded by the bracket. Journaling the end in place is a pin 70 which fits into bore 64, such pin extending through a bore 72 in bracket 66 and being joined to a stub plate 74. Detachably connecting the stub plate to the bracket is a fastener, such as screw 76. The connection described is easily taken apart to permit removal of pin 70 and separation of a rod from its associated kicker arm.

Considering the vehicle as shown in FIGS. 1 and 2, journal pins 60 for the operating rods accommodate pivoting of the rods about an axis laterally offset from the pivot axis provided by pivot means 52 for the stirrups. The rods have considerable length, and when connected to the kicker arms extend rearwardly of back plate 42 in the bucket. As a consequence, when the kicker arms are pivoted in a clockwise direction in FIG. 2, from the position shown in FIG. 2, forces are exerted on the bucket tending to shift it from a substantially horizontal position to a more upright position, and this shifting of the bucket takes place with relatively little forward movement of the bottom ends of the kicker arms. In fact, the bucket may be positioned substantially at right angles to the lifting forks with the kicker arms moved only to the extent that their forward ends are adjacent the tips of the lifting forks. With the bucket positioned relative to the lifting forks as shown in FIG. 1, the rods extend across the floor plate of the bucket.

Figures 3, 4, 5:
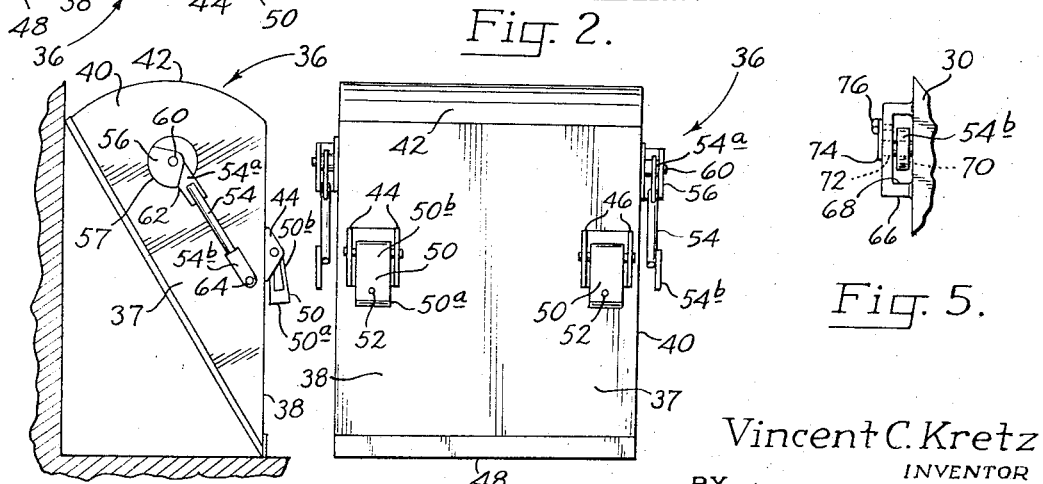
FIG. 3 illustrates the bucket detached from the vehicle and resting against a wall, as may be done when storing the bucket.
FIG. 4 shows portions of the bucket viewing the bottom of the bucket as shown in FIG. 3.
FIG. 5 is a view, somewhat enlarged, taken along the line 5—5 in FIG. 2.

It is convenient to store the bucket when it is not in use in the position illustrated in FIG. 3, with the bucket upright and with the top thereof resting against a wall. This exposes the underside of floor plate 38 and the stirrups mounted thereon. Furthermore, in this position the operating rods extend generally toward the region of the floor plate. To mount the bucket on material-handling mechanism 20, the vehicle is driven up to the bucket and its lifting forks manipulated to place them adjacent the stirrups which then may be easily shifted over the tips of the lifting forks and fastened in place. To connect the operating rods, it is only necessary then to swing the kicker arms forwardly to adjacent the rear ends of the operating rods, and thence to connect these ends using brackets 66 and the journal pins, as previously described.

It should be apparent from the above description that the vehicle contemplated has multiple uses. With the bucket removed from the material-handling mechanism the lifting forks may be employed in the lifting of logs and related objects. The bucket during this time is stored in a small space. When it is desired to clean up debris in the log yard, the bucket may be attached to mechanism 20 as described with the lifting forks and kicker arms in conjunction with the bucket serving to make the vehicle a versatile front end loader. Connecting of the bucket to the material-handling mechanism is readily accomplished.

While an embodiment of the invention has been described, variations are possible without departing therefrom. It is desired to cover all such modifications and variations as would be apparent to one skilled in the art, and that come within the scope of the appended claims.

It is claimed and desired to secure by Letters Patent:

1. The combination of a vehicle,
material-handling mechanism mounted on said vehicle beyond one end thereof including a forwardly mounted raisable platform, and a power-actuated movable arm operable when actuated to push material forwardly from said platform,
a scoop bucket,
detachable pivot means detachably connecting said scoop bucket to said platform, with the bucket being tiltable about an axis extending transversely of the vehicle, and
detachable means operatively connecting said bucket to said power-actuated arm, with said arm in a position to tilt said bucket on actuation of the arm.

2. In combination with a vehicle,
material-handling mechanism mounted on said vehicle beyond one end thereof including at least one raisable fork and a power-operated kicker arm for shifting a load off said fork,
a bucket superimposed over said fork including sides and a floor plate,
at least one stirrup pivotally connected to the underside of said floor plate, said stirrup fitting about and being detachably mounted on said fork, and
means detachably connecting said kicker arm and bucket whereby on actuation of the arm the bucket is tilted with pivoting in said stirrup.

3. In combination with a vehicle,
material-handling mechanism mounted on said vehicle beyond one end thereof including raisable fork-lift means, and a power-actuated kicker arm operable when actuated to shift material forwardly from off said fork-lift means,
a bucket detachably and pivotally mounted on said fork-lift means, said bucket including a floor plate, sides and an operating rod journaled at one end to a side of said bucket, and means journaling the end of said rod opposite its said one end to said kicker arm, with said kicker arm operable when actuated to tilt said bucket on said fork-lift means.

4. A bucket assembly adapted to be mounted on the forks of a fork lift attachment of a vehicle, comprising a bucket having a floor plate, sides and a back, a pair of stirrups pivotally mounted on the underside of said floor plate with the stirrups being pivotable about an axis extending between the sides of the bucket, said stirrups being mountable over the ends of the forks of a fork-lift attachment, and an elongated operating rod journaled at one end to a side of said bucket at a point laterally offset from said axis about which the stirrups are pivotable, said rod having an end opposite said one end which, with the rod extending rearwardly on the bucket, is located rearwardly of the back of said bucket.

5. The bucket assembly of claim 4, wherein the bucket further comprises stop means defining a limit position for the operating rod relative to the bucket, said rod in said limit position occupying a position extending past the floor plate thereof.

6. In combination with a vehicle,
material-handling mechanism mounted on at least a pair of raisable forks, and a power-actuated kicker arm operable when actuated to shift a load forwardly off said forks,
a scoop bucket comprising a bottom-forming floor plate, opposed vertical side plates and a back plate enclosing three sides of the bucket,
laterally spaced stirrups pivotally mounted on the underside of said floor plate, said stirrups fitting over the ends of said forks and being detachably engaged from the forks,
said stirrups being pivotable about an axis extending between the side plates of the bucket and providing a pivot axis about which said bucket may tilt relative to said forks, and
an operating rod journaled at one end to a side plate of said bucket at a point laterally offset from said pivot axis, said rod having an opposite end connected to said power-actuated kicker arm, and the kicker arm on being actuated being operable to tilt said bucket about said pivot axis.

7. In combination with a vehicle,
material-handling mechanism mounted on the vehicle beyond one end thereof, including at least a pair of laterally spaced elevatable substantially horizontal forks, and a pair of power-operated kicker arms extending downwardly adjacent the rear ends of said forks, one laterally outwardly of each fork, said kicker arms having bottom ends adjacent the rear ends of said forks that on actuation of the arms move forwardly along the forks to adjacent the forward ends of the forks, a bucket comprising a bottom plate, opposite side plates, and a rear plate enclosing three sides of the bucket disposed over said forks,
laterally spaced devices pivotally mounted on the underside of said bottom plate, said devices being detachably mounted on the forward ends of said forks whereby they secure the bucket on the forks,
a pair of operating rods journaled on the outer sides of the side plates of the bucket, one on each, said rods extending rearwardly on the bucket and having rear ends disposed adjacent the bottom ends of said fork, and
means detachably securing the rear ends of said rods to the bottom ends of the kicker arms, one to each, including pivot means accommodating pivotal movement of a kicker arm relative to the operating rod connected thereto.

8. The combination of a vehicle frame with
ground-traveling means supporting it on the ground,
raisable lifting forks attached at one end to said frame,
a power-actuated kicker arm journaled to said frame,
a scoop bucket superimposed over said forks, said bucket comprising a floor plate with a forward edge forming a scraping edge and vertical sides and back plates attached to said floor plate,
stirrups pivotally connected to the underside of said floor plate, said stirrups being laterally spaced apart and having pivot axes which are in line forming an axis extending transversely of the vehicle about which said bucket may tilt, said stirrups detachably engaging said forks, and
an operating rod and journal means journaling one end of said rod to a side plate of the bucket, said rod having an opposite end detachably connected to said power-actuated kicker arm, said kicker arm on actuation tilting said bucket through shifting of said operating rod, said journal means including means forming a stop limiting pivotal movement of said rod relative to the bucket.

References Cited
UNITED STATES PATENTS

| | | | |
|---|---|---|---|
| 2,490,772 | 12/1949 | Benner | 214—620 |
| 2,582,759 | 1/1952 | Sass | 214—620 |
| 3,115,261 | 12/1963 | Antolini | 214—620 |

HUGO O. SCHULZ, *Primary Examiner.*